Feb. 6, 1962 E. B. NICHOLS 3,020,104
BEARINGS
Filed Nov. 26. 1956
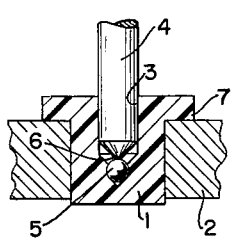
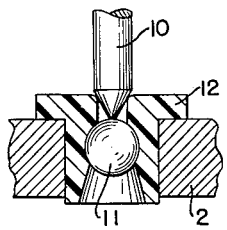
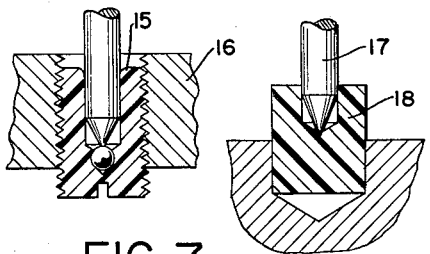
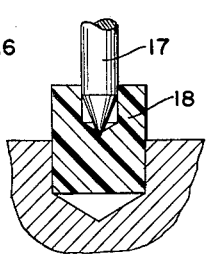
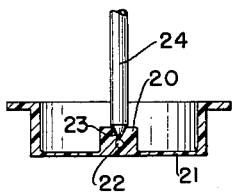
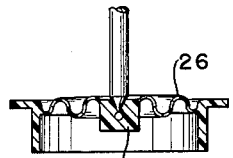
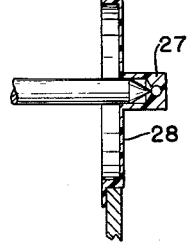
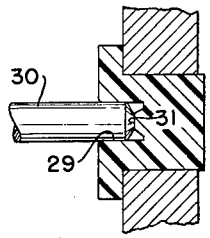
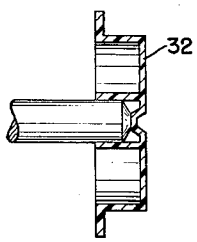
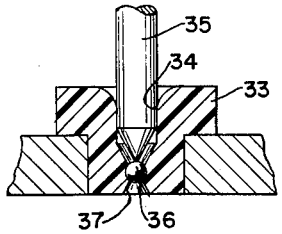
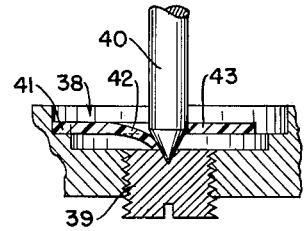
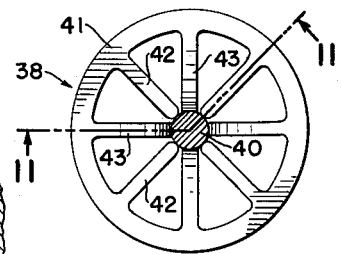
INVENTOR
EDGAR B. NICHOLS
BY
Pennie, Edmonds, Morton, Barrows & Taylor
his ATTORNEYS

3,020,104
BEARINGS
Edgar B. Nichols, 325 W. Main St., Moorestown, N.J.
Filed Nov. 26, 1956, Ser. No. 624,383
1 Claim. (Cl. 308—159)

This invention relates to bearings and particularly bearings for precision instruments and the like where the moving parts must be free from lost motion and precisely positioned but do not carry sufficient loads to require the supporting members to have high compression resistance or tensile strength.

I have discovered that nylon may be used in the making of such bearings in lieu of metal in many instances, with a resulting greater accuracy in the positioning of the parts, greater freedom from lost motion and greater resistance to wear.

My invention consists broadly in the use of nylon as a wearing and supporting member for the rotating parts of precision instruments and the like.

My invention also includes a number of novel bearing structures in order to obtain the maximum benefits from the nylon parts included in said bearings.

In the accompanying drawings I have shown in section a number of bearings wherein nylon is employed in whole or in part as a support for the rotating shaft.

Referring to said drawings, FIG. 1 shows a simple supporting bearing for a shaft, for example, the shaft of the rocker of a clockwork escapement. The bearing as here shown comprises a block 1 of nylon seated in a hole in the frame member 2 of the instrument of which the shaft forms a part. The block 1 has a central bore 3 of considerable depth and of a diameter to accurately fit the shaft 4 supported in the bearing. The nylon may be readily molded or machined to exact dimensions and even though the clearance between the shaft and the bore of the nylon is in the order of a few millionths of an inch, the bearing does not develop friction to an extent comparable with the friction which develops in an all metal bearing of similar design.

At the bottom of the bore 3 there is preferably seated a steel ball 5 on which is seated the end of the shaft 4 which, as shown, is ground to a point 6, thus providing a very limited area of contact between the metal of the shaft and the metal of the ball. In using the bearing the flange 7 of the block 1 may be made initially somewhat thicker than required and ground down when the bearings are assembled to accurately position the shaft longitudinally with respect to the frame of the instrument and if desired the bore 3 in which the ball is mounted may be slightly eccentric with respect to the outer circumference of the block so that by turning the block in the frame the shaft will be adjusted transversely. In this way, when the parts are assembled the shafts may be very accurately positioned both axially and transversely without requiring the fitting together of metal parts which are very costly to manufacture to close tolerances.

FIG. 2 shows a modified form of bearing wherein the shaft 10 is supported by a large bearing ball 11 supported in a block of nylon 12 seated as shown in the frame of the instrument. In this bearing the ball is thrust into place through the under side of the block into the bore of the block which is flared outwardly on the under side to receive the ball. The end of the shaft is machined to a point as shown, which point engages the curved surface of the ball, and its conical surface between the point and the cylindrical portion of the shaft engages the upper edge of the bore of the block. The clearance between the conical surface of the end of the shaft and the perimeter of the bore is primarily supported by the ball which is accurately centered by the surrounding bore of the plastic block.

The bearing of FIG. 2 will withstand shocks such as instruments mounted on aeroplanes, etc. are normally subjected to a much greater degree than the conventional all metal bearings. The ball 11 is held in place by the contraction of the nylon beneath the ball when the ball is thrust into its seat, and the nylon will expand under impact permitting the ball to move slightly away from the spindle. The momentum of the shaft is also cushioned by the nylon, which is expanded by the tapered surface of the spindle.

FIG. 3 shows a bearing similar to the bearing of FIG. 1 but with the nylon block 15 threaded for longitudinal adjustment in the frame 16 of the instrument of which the bearing forms a part.

In the bearing shown in FIG. 4 the ball 5 is omitted and the point at the end of the shaft is seated in a conical recess formed at the bottom of the bore for the spindle 17 of the nylon block 18. This is a very cheap bearing but nevertheless provides a support for an instrument shaft which is unusually accurate both as regards lost motion and the positioning of the shaft. In many precision instruments the members carried by the shafts are not only of negligible weight, but the required movements are slow and infrequent. I have found that nylon bearings such as those shown in FIG. 4 can in assembling the instrument be readily set up with great accuracy and will through the expected life of the instrument accurately support the shaft for free movement with a minimum of lost motion.

I have also found that the nylon of itself provides an inexpensive spring suspension for the bearings which will absorb shocks incidental to transportation of the instruments and which are unavoidably present when the instruments are mounted on airplanes or other moving supports.

As shown in FIG. 5, the block of nylon 20 is formed as a projection right in the center of a molded nylon cup whose bottom wall 21 is thin enough to form in effect a diaphragm capable of vibrating through a limited amplitude without deformation. The bearing itself shown in FIG. 5 is the same as shown in FIG. 1 except that the supporting ball 22 is positioned so that the point of contact of the spindle is at the apex of the conical depression 23 corresponding to the end of the spindle 24. The end pressure which is slight under normal operating conditions is distributed between the ball and the wall of the conical recess overlying the wall, but when the bearing is subjected to shock the ball will "give" sufficiently through slight compression of the under-lying nylon so that the contacting conical surfaces of bearing and spindle take the brunt of the shock, thereby protecting the point of the spindle from injury.

FIG. 6 shows a modified form of the bearing shown in FIG. 5 but wherein the nylon block 25 which supports the shaft is carried by a corrugated diaphragm 26 which permits a vibration of greater amplitude than the flat diaphragm shown in FIG. 5.

FIG. 7 illustrates the bearing of FIG. 1 fitted to a diaphragm support similar to that shown in FIG. 5. FIG. 7 shows the bearing as a supporting bearing for a horizontal rotating shaft, and it will be understood that all the bearings illustrated may be so used, although shown for convenience of illustration as bearings for vertical spindles. The bearing of FIG. 7 is similar to the bearing of FIG. 1 but with the spindle supporting portion 27 at the center of a flexible diaphragm 28 similar to the diaphragm shown in FIG. 5.

The bearing of FIG. 8 is an all nylon bearing suitable for either horizontal or vertical spindles. It has a central cylindrical bore 29 fitting the spindle 30 and an axial positioning projection 31 at the end of the bore for holding the shaft against axial displacement. The end of the spindle 30 and the face of the projection 31 are flat as shown to provide additional bearing surface.

FIG. 9 shows the bearing of FIG. 8 supported by a flexible diaphragm 32, the arrangement being similar to that shown in FIG. 7.

The bearing shown in FIG. 10 is particularly advantageous for use in instruments subjected to vibration and shock. The bearing comprises a nylon plug 33 having a central bore 34 having a cylindrical portion fitting the spindle 35 adjacent its tapered end and a tapered portion surrounding the tapered portion of the spindle and in which is mounted a ball 36 in contact with the end of the spindle. The ball 36 is retained in a groove at the end of the above mentioned tapered portion and in assembling the bearing is thrust into the groove through an outwardly flaring extension 37 of the bore 34. The nylon is sufficiently elastic to permit the passage of the ball into the groove without permanent distortion. The elasticity of the nylon also permits the ball to move axially of the bore 34 when the instrument is subjected to vibration or shock and thus prevent damage to the contacting surfaces of the ball and spindle which would result if the ball were immovably supported.

In the bearings shown in FIGS. 11 and 12 the nylon member 38 provides a supplemental bearing to relieve the contact metal portions of the bearing of wear and pressure. As here shown the metal bearing consists of an adjustable bearing member 39 having a tapered seat for the end of the spindle 40. The nylon member 38 consists of an annular rim 41 having a series of inwardly projecting spokes 42 and 43. The member 38 is supported concentrically with the member 38 and the spokes 42 are of such length that their inner ends contact the spindle adjacent its tapered end to thereby hold the spindle against lateral displacement. The alternate spokes 43 are longer and are of progressively reduced thickness toward their inner ends which engage the tapered end of the spindle as shown and provide a resilient thrust bearing for the spindle.

The other end of the spindle 40 is preferably supported in a bearing of the same construction except that the member 39 need not be adjustable. Under normal operation the spokes 43 hold the ends of the spindle out of contact with the metal bearings 39 even though the clearance between the spindle and the bearings 39 is just sufficient to permit free rotation, but if the instrument is subjected to vibration or shock the spokes will yield and the metal bearings will support the spindle just as they would if the members 38 were not there.

The nylon members are cheap and easily replaced and serve to greatly prolong the life and accuracy of the metal bearing surfaces.

In the foregoing specification I have used the word "nylon" to mean the polyamide resins marketed under that name and also the generically similar products marketed under other trade names, such as "Teflon."

I have hereinabove described a number of specific embodiments of my invention, but it will be understood that the invention is not limited to such embodiments but includes all modifications thereof within the scope of the appended claim.

I claim:

A bearing assembly comprising a shaft having a tapered end, a support, a piece of nylon carried thereby, said piece having a bore in which said shaft is rotatively mounted and held against radial movement and a metal ball in said bore with a diameter in axial alignment with the axis of said shaft, said bore extending beyond said ball and having a circumferential groove in which said ball is retained.

References Cited in the file of this patent

UNITED STATES PATENTS

| | | |
|---|---|---|
| 1,125,700 | Lovejoy | Jan. 19, 1915 |
| 1,366,132 | Pitkin | Jan. 18, 1921 |
| 2,548,905 | Odenweller et al. | Apr. 18, 1951 |
| 2,615,069 | Gallagher | Oct. 21, 1952 |
| 2,724,945 | McGhee | Nov. 29, 1955 |

FOREIGN PATENTS

| | | |
|---|---|---|
| 566,977 | France | Nov. 29, 1923 |